Figure 1:
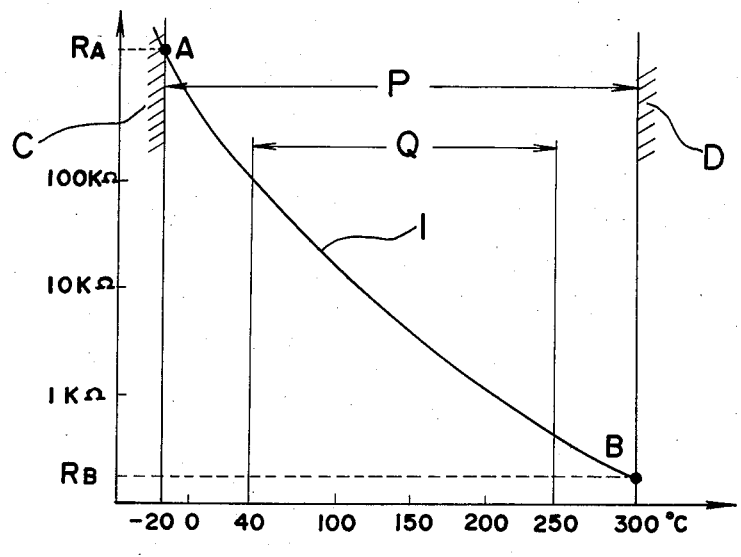

United States Patent [19]

Tateda

[11] Patent Number: 4,626,663

[45] Date of Patent: Dec. 2, 1986

[54] METHOD AND APPARATUS FOR DETECTING PROBLEMS OF TEMPERATURE CONTROL DEVICE

[75] Inventor: Koichi Tateda, Yao, Japan

[73] Assignee: Sharp Kabushiki Kaisha, Osaka, Japan

[21] Appl. No.: 754,207

[22] Filed: Jul. 11, 1985

Related U.S. Application Data

[63] Continuation of Ser. No. 421,510, Sep. 22, 1982, abandoned.

[30] Foreign Application Priority Data

Sep. 29, 1981 [JP] Japan .................................. 56-155953

[51] Int. Cl.⁴ .............................................. H05B 1/02
[52] U.S. Cl. .................................. 219/504; 219/505; 219/492; 219/497
[58] Field of Search ............... 219/501, 504, 494, 497, 219/492, 506; 307/117; 323/235, 236, 319

[56] References Cited

U.S. PATENT DOCUMENTS

| | | | |
|---|---|---|---|
| 3,789,190 | 1/1974 | Orosy et al. | 219/497 |
| 3,959,692 | 5/1976 | Wetzel | 219/499 |
| 4,109,134 | 8/1978 | Van Herten | 219/499 |
| 4,300,037 | 11/1981 | Padden | 219/497 |
| 4,343,990 | 8/1982 | Ueda | 219/492 |
| 4,403,302 | 9/1983 | Young et al. | 219/492 |
| 4,442,344 | 4/1984 | Yasuda | 219/501 |

Primary Examiner—M. H. Paschall
Attorney, Agent, or Firm—Birch, Stewart, Kolasch & Birch

[57] ABSTRACT

The disclosure is directed to an improved trouble detecting method of a temperature control device including a thermo-sensitive element such as a thermistor or the like for application to a heating apparatus, for example, a cooking apparatus or the like. The detecting method includes the steps of energizing the temperature control device for a predetermined period of time, and comparing an output of the temperature control device and a reference output for judgement.

8 Claims, 2 Drawing Figures

METHOD AND APPARATUS FOR DETECTING PROBLEMS OF TEMPERATURE CONTROL DEVICE

This application is a continuation of application Ser. No. 421,510 filed on Sept. 22, 1982, now abandoned.

The present invention generally relates to a trouble shooting method and apparatus and more particularly, to a method of detecting problems in a temperature control device employing a thermo-sensitive or heat-sensitive element (referred to as a thermo-sensitive element hereinbelow) such as a thermistor or the like, due to wire breakage, short-circuit, etc.

Commonly, temperature control devices as referred to above are widely employed, for example, in cooking apparatus such as electric ovens, microwave ovens, etc. for proper control of temperatures during cooking.

In general, the thermo-sensitive element such as a thermistor, etc. has resistance-temperature characteristics as shown in a graph of FIG. 1, and shows high resistances exceeding 1 MΩ at a low temperature range, and low resistances far below 1 KΩ at a high temperature range.

Incidentally, for detecting problems of a thermo-sensitive element having characteristics as described above, due to wire breakage or short-circuit, it has been a common practice to detect a resistance value across the thermo-sensitive element, i.e. an output voltage obtained upon energization of the thermo-sensitive element for comparison with a reference voltage, through utilization of the fact that in the case of wire breakage, a considerably high resistance is indicated, while, upon short-circuiting, an extremely low resistance value is observed.

With respect to the graph of FIG. 1, if a resistance R of the thermo-sensitive element is larger than a resistance value $R_A$ at a point A of a characteristic curve I, it has been judged in the conventional practice that the thermo-sensitive element is broken (a region C), while on the contrary, if the resistance R of the thermo-sensitive element is smaller than a resistance value $R_B$ at a point B, the thermo-sensitive element has been judged to be short-circuited (a region D).

It is to be noted here that, in the graph of FIG. 1, the temperature range necessary for detecting problems of the thermo-sensitive element is represented by a reference symbol P, while the temperature range required for a cooking apparatus or the like is denoted by a reference symbol Q.

In connection with the above, if the resistance of the thermo-sensitive element is measured at extremely low atmospheric temperatures, in the order of −20° C. or thereabout, the resistance value becomes extremely large, due to its approach towards the region noted as point A as described above, with a consequent increase in the output voltage across the thermo-sensitive element which exceeds the reference voltage, thus leading to an erroneous judgment in some cases that the thermo-sensitive element is broken.

It is so arranged in the conventional practice that, if the thermo-sensitive element is determined to be broken as described above, this may be regarded as a problem in the thermo-sensitive device so that the safety circuit is actuated to stop all functions of the apparatus. Therefore, in such a situation, a cooking apparatus equipped with such a temperature control device will not be able to achieve the necessary cooking operation.

Accordingly, an essential object of the present invention is to provide an improved method of detecting problems of a temperature control device for use, for example, in a cooking apparatus or the like, which is free from erroneous judgements of problems in a thermo-sensitive element employed in the temperature control device.

Another important object of the present invention is to provide a method of detecting problems of a temperature control device as described above, which is simple in its steps and readily applied to various heating apparatus and the like through a simple arrangement.

A further object of the present invention is to provide a heating device arranged to effect the problem detecting method of the temperature control device as described above in an efficient manner.

In accomplishing these and other objects, according to the present invention, there is provided a method of detecting problems in a temperature control device which is characterized in that a thermo-sensitive element is energized for a predetermined period of time so that an actual resistance value of the thermo-sensitive element is lowered to a certain extent through a temperature rise in the thermo-sensitive element itself by said energization, even when the atmospheric temperature is extremely low in the order of approximately −20° C. or thereabout, and thereafter, the output voltage of the thermo-sensitive element is compared with a reference output voltage for making a judgment determination.

More specifically, according to one preferred embodiment of the present invention, there is provided a problem detecting method of a temperature control device for application to a heating apparatus such as a cooking apparatus or the like, which includes the steps of passing current through, i.e. energizing the temperature control device for a predetermined period of time, and then, comparing the output of said temperature control device with a reference output for making a judgment determination.

By the steps of the present invention as described above, an improved trouble detecting method of a temperature control device has been presented, with the substantial elimination of the disadvantages inherent in the conventional detecting methods of this kind.

Figure 2:
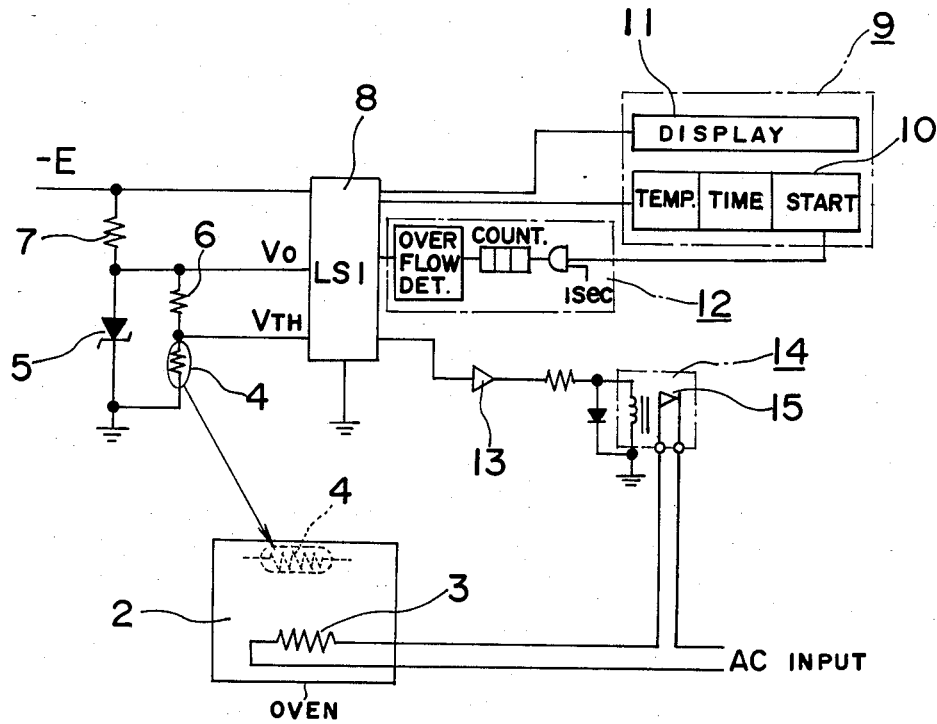

These and other objects and features of the present invention will become apparent from the following description taken in conjunction with the preferred embodiment thereof with reference to the accompanying drawings, in which;

FIG. 1 is a diagram in a graphical form representing resistance-temperature characteristics of a thermo-sensitive element such as a thermistor or the like (already referred to), and FIG. 2 is an electrical block diagram showing an essential portion of a cooking apparatus to which the detecting method according to the present invention may be applied.

Referring now to the drawings, one preferred embodiment of the present invention as applied to a cooking apparatus will be explained hereinbelow.

In FIG. 2, there is shown an electrical circuit diagram representing an essential portion of a cooking apparatus or electric oven to which the problem detecting method of a temperature control device according to the present invention may be applied.

The cooking apparatus of FIG. 2 generally includes a heating chamber 2, a heater 3 provided in the heating chamber 2 and coupled to an AC power supply for effecting cooking by heating, and a thermo-sensitive or heat-sensitive element 4 such as a thermistor or the like which may also be disposed in the heating chamber 2 for measuring temperatures within said heating chamber 2, and which is connected in parallel to a Zener diode 5 through a resistor 6, with said Zener diode 5 being connected to a DC power source ($-E$) through another resistor 7. An output voltage of the Zener diode 5 as a reference voltage $V_0$ and an output voltage $V_{TH}$ of the thermo-sensitive element 4 are respectively introduced into an LSI8 (Large scale integrated circuit M58845, manufactured by Mitsubishi Electric Corporation, Japan) having a comparator or the like (not particularly shown) incorporated therein. The LSI8 is further coupled to a cooking apparatus control section 9 which includes a key unit 10 for setting heating time, heating temperatures, or heating start, and a display device 11 for displaying the heating time and heating temperatures, etc. Between the LSI8 and the key unit 10 of the control section 9, there is inserted a delay circuit 12 which includes a known gate circuit and a counter circuit, etc. for setting a predetermined delay time after depression of a heating start key of the key unit 10, with an output of the delay circuit 12 being applied to the LSI8 described above. The LSI8 is also coupled to a driver IC (integrated circuit) 13 which is actuated by the output signal of the LSI8 when a relation that the output voltage $V_{TH}$ of the thermo-sensitive element 4 is larger than the reference voltage $V_0$ ($T_{TH} > V_0$) is established through comparison between said voltages $V_{TH}$ and $V_0$ by the LSI8, and which is further connected, through a resistor and a diode, to a relay 14 which is controlled by the output signal of the driver IC13 and coupled to the heater 3 provided in the heating chamber 2, with a relay contact 15 of the relay 14 being arranged to function to control energization of said heater 3 by the AC power supply connected thereto.

By the above arrangement, functionings of the cooking apparatus of FIG. 2 will be described hereinbelow.

In the first place, upon starting of heating through operation of the key unit 10 of the control section 9, the heater 3 in the heating chamber 2 is energized by the AC power supply, while Zener voltage to be determined by the DC power source ($-E$) is applied to the thermo-sensitive element 4.

Thereafter, the resistance value of the thermo-sensitive element 4 is gradually reduced by the rising of temperature within the heating chamber 2 heated by the heater 3, and the output voltage $V_{TH}$ of the thermo-sensitive element 4 is also lowered correspondingly.

In the above state, upon lapse of a predetermined period of time (for example, a time period longer than ten seconds), after starting of heating of the cooking apparatus, the reference voltage $V_0$ and the output voltage $V_{TH}$ of the thermo-sensitive element 4 are compared in the LSI8 by the output signal of the delay circuit 12, and if the relation is $V_{TH} < V_0$, the heater 3 is energized by the AC power supply through the electrical circuit as shown in FIG. 2, with the control relay 14 repeating ON/OFF functions so as to maintain the temperature within the heating chamber 2 at a set value.

On the contrary, if the above relation is $V_{TH} > V_0$, it is indicated that the resistance value of the thermo-sensitive element 4 is abnormally high, and thus, judgment is made that the thermo-sensitive element 4 is broken, and in this case, the relay 14 is driven through the driver IC13 by the signal produced from the LSI8 so as to suspend energization of the heater 3 by opening the relay contact 15, while an error indication is given in the display device 11 of the control section 9 for notification of the problem in the thermo-sensitive element to the operator.

Since it is so arranged that the comparison between the output voltage $V_{TH}$ of the thermo-sensitive element 4 and the reference voltage $V_0$ for judgment is effected in the LSI8 immediately after starting of heating by the delay time set in the delay circuit 12, even when the cooking apparatus is used, for example, in a place where atmospheric temperature is extremely low, temperature rise to a certain extent is noticed in the thermo-sensitive element 4 during the above delay time so that the comparison for judgment is effected at a region where the resistance value is considerably lowered, in comparison with its large resistance value of such an extent as may be wrongly judged to be wire breakage in the element 4, and therefore, there is no possibility of erroneous judgement at all.

It should be noted here that in the foregoing embodiment, although the present invention has been mainly described with reference to the case where it is applied to a cooking apparatus, the concept of the present invention is not limited in its application to such a cooking apparatus alone, but may readily be applied to any other heating apparatus in general for detecting problems in the thermo-sensitive elements of this kind.

As is clear from the foregoing description, according to the present invention, since it is arranged to detect troubles of the temperature control device through comparison between the output of the temperature control device and the reference output, after energization of the temperature control device for a predetermined period of time, the troubles of the temperature control device may be correctly detected, even when the atmospheric temperatures are extremely low, and thus, the detecting method according to the present invention has a wide range of applications.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A heating apparatus comprising:
   a heating chamber;
   a heater disposed in said chamber;
   temperature control means for controlling temperature within said heating chamber to a desired temperature by driving said heater, said temperature control means including a thermo-sensitive element responsive to the temperature of said heater and producing an output related thereto, said temerature control means including;
   problem detection means for detecting a problem in said temperature control means, said problem detection means including,
   delay means, initiated by the energization of said heater by said temperature control means, for developing a detect signal a predetermined time after said heater is energized, said predetermined time being sufficient to vary the output of said thermo-sensitive element but less than the period necessary to raise the temperature within said chamber to the desired temperature, and means, responsive to development of said detect signal by said delay means, for comparing the output of said thermo-sensitive element to a reference value to determine if said output has varied, said means for comparing developing defect signal when no variation of said output is detected; and means for disconnecting the drive of said heater by said temperature control means in response to development of said defect signal.

2. A heating apparatus comprising:
a heating chamber;
a heater provided in said heating chamber, said heater coupled to an AC power supply;
a thermo-sensitive element provided in said heating chamber;
input means for introducing heating time and temperature and starting said heating apparatus;
a D.C. voltage supply;
said thermo-sensitive element having a variable resistance and forming part of a voltage divider connected across said D.C. voltage supply;
control means, responsive to said input means, for monitoring the voltage developed across said thermosensitive element and controlling the application of AC power to said heater, said control means including;
problem detection means for detecting a problem with said thermo-sensitive element, said problem detection means including,
delay means, initiated by the energization of said heater by said temperature control means, for developing a detect signal a predetermined time after said heater is energized, said predetermined time being sufficient to vary the output of said thermo-sensitive element but less than the period necessary to raise the temperature within said chamber to the desired temperature, and means, responsive to development of said detect signal by said delay means, for comparing the output of said thermo-sensitive element to a reference value to determine if said output has varied, said means for comparing developing defect signal when no variation of said output is detected; and means for disconnecting the drive of said heater by said temperature control means in response to development of said defect signal.

3. The heating apparatus of claim 2 wherein said input means includes a key unit for setting heating time, heating temperature, and heating start and also includes a display for heating time and heating temperature.

4. The heating apparatus of claim 3 wherein said voltage divider is connected in parallel with a zener diode to regulate the voltage applied thereto by said D.C. voltage supply.

5. The heating apparatus of claim 4 wherein the voltage applied across said zener diode is used by said means for comparing as said reference voltage.

6. The heating apparatus of claim 5 wherein said temerature control means and means for comparing are formed as an integrated circuit.

7. The heating apparatus of claim 6 wherein said delay means comprises a gate circuit and a counter circuit, said delay means being interposed between said input means and said integrated circuit.

8. The heating apparatus of claim 7 wherein said means for disconnecting comprises:
an amplifier having an output and an input connected to said integrated circuit, and
a relay having a coil connected to the output of said amplifier and contacts connected in series with said heater to said AC power supply.

* * * * *